UNITED STATES PATENT OFFICE.

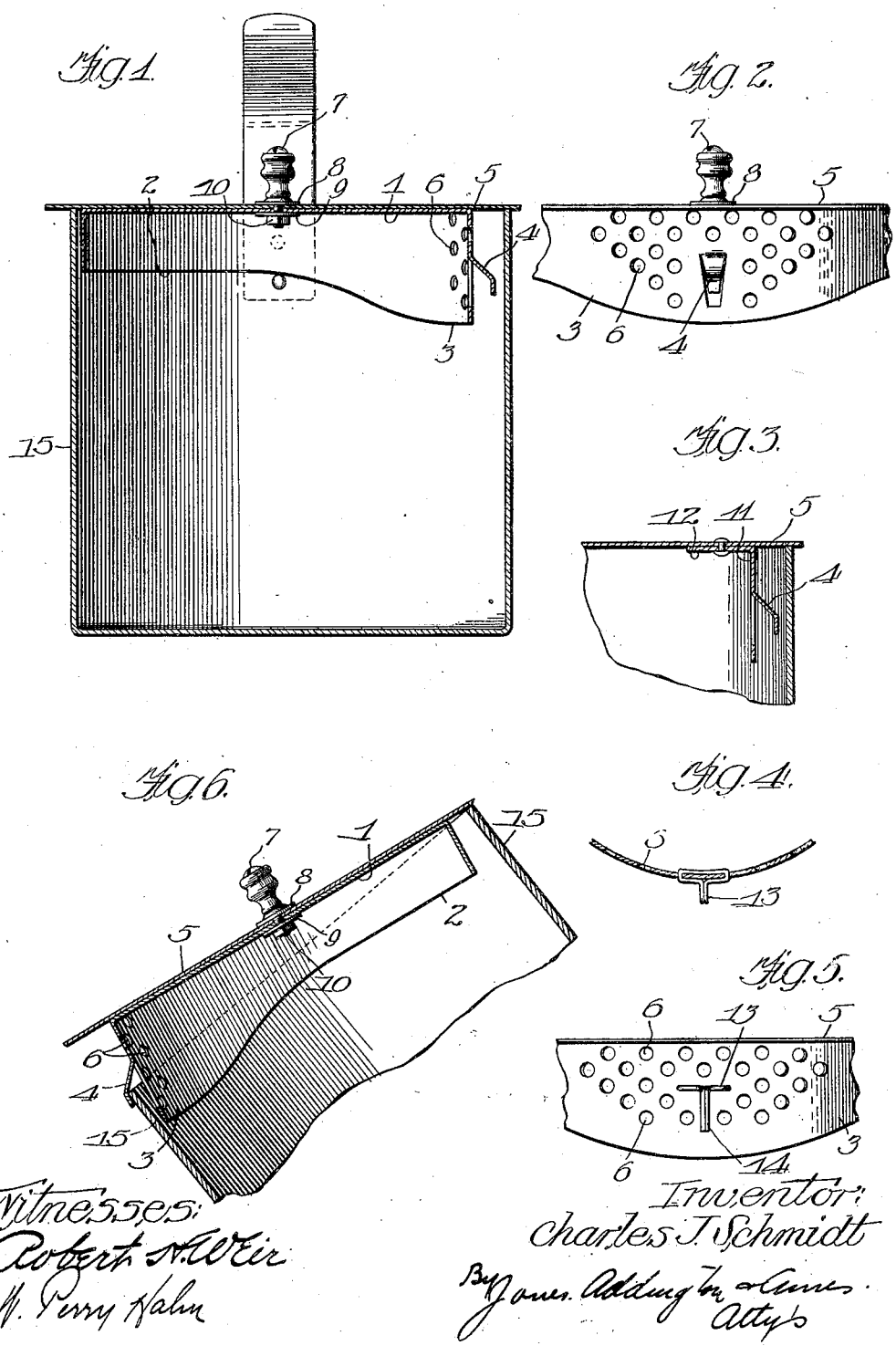

CHARLES J. SCHMIDT, OF CHICAGO, ILLINOIS.

KETTLE-COVER.

No. 922,341.  Specification of Letters Patent.  Patented May 18, 1909.

Application filed November 16, 1908. Serial No. 462,779.

*To all whom it may concern:*

Be it known that I, CHARLES J. SCHMIDT, a citizen of the United States, residing at Chicago, in the county of Cook and State of Illinois, have invented new and useful Improvements in Kettle-Covers, of which the following is a full, clear, concise, and exact description, reference being had to the accompanying drawing, forming a part of this specification.

My invention relates to improvements in covers for cooking pots, vessels, and the like.

One of the objects of my invention is to provide means whereby the cover may be manipulated to permit liquid to be drained from the vessel without the escape of the solid matter or food contained therein.

A further object of my invention is to provide means whereby, while the cover may be manipulated to drain the liquid from the vessel, the cover, when in normal position, will effectually close the vessel to retain the steam within the same for the purpose of expeditiously cooking the food.

I have illustrated in the accompanying drawing, for the purpose of disclosing my invention, certain forms which my invention may take.

In said drawing—Figure 1 is a transverse sectional view of a cooking vessel, showing a sectional view of the lid with my attachment in position; Fig. 2 is a partial front elevation of the cover; Fig. 3 is a sectional detail view of the modification of my invention; Fig. 4 is a transverse sectional detail view of still another modification of my invention taken on the line 4—4 of Fig. 5; Fig. 5 is a front view of the modified form of my invention illustrated in Fig. 4; and Fig. 6 is a partial sectional view showing the position which the cover may take when the liquid is being drained from the vessel.

In the preferred embodiment of my invention, as illustrated in Figs. 1, 2 and 6, I provide a flat plate 1, preferably of metal, having a down-turned annular flange 2. At one point 3 the flange is made wider than at the remaining points, and a portion thereof is stamped up to form a tongue 4. The wider portion of the flange is perforated, as at 6, to provide a foraminous portion through which the liquid may drain. The structure thus formed is eccentrically secured to the cover 5 by the same screw which secures thereto the handle. In securing the handle in position the screw 7 is passed through the handle, then passes through a washer 8, through the cover and the top 1, thence through a second washer 9, and has secured on its end a nut 10.

In Fig. 3 I have illustrated a modification of my invention. In this form of my invention I merely provide a down-turned projection 11 having an angular extension 12 by which it is riveted to the cover 5, and provided with the tongue 4. By such an arrangement I am enabled to tilt the cover and thereby form a slight opening between the cover and the edge of the vessel, to permit the escape of the liquid.

In the modification illustrated in Figs. 4 and 5, instead of forming the tongue 4 by striking up a portion of the flange, the tongue is preferably formed of a loop of wire 13 which is passed through the flange and turned downwardly to form a tongue 14.

In Fig. 6 I have shown the device in position for the purpose of straining. In this position it will be seen that the tongue 4 engages over the edge of the vessel 15 and the cover is held in a tilted or angular position to permit the escape of the liquid through the strainer openings 6. It will be noted that due to the arrangement of my device, when the cover is tilted in this manner the lower edge of the flange engages the inside of the vessel while the tongue 4 fits over the edge of the vessel, whereby any tendency on the part of the cover to move laterally is prevented.

Having thus described my invention, what I claim as new and desire to secure by Letters Patent, is:

1. In a device of the character described, the combination with a cover, of a downwardly extending circular flange secured to said cover and having a foraminous section, and a tongue on said flange so disposed that when held in engagement with the edge of the cooking vessel the cover is retained in a tilted position.

2. In a device of the character described, the combination with a cover, of a downwardly extending member secured to said cover and having a foraminous section, and a tongue on said member so disposed that when held in engagement with the edge of the cooking vessel the cover is retained in a tilted position.

3. In a device of the character described, the combination with a cover, of a strainer member comprising a top plate having a downwardly extending member having a foraminous section, secured to said cover, said flange being provided with a tongue so disposed that when held in engagement with the edge of the cooking vessel the cover is retained in a tilted position.

4. In a device of the character described, the combination with a cover, of a strainer member comprising a top plate having a downwardly extending flange having a portion of increased width, said portion being formed with a plurality of holes therethrough, the widened portion of the flange being provided with a tongue so disposed that when held in engagement with the edge of the cooking vessel the cover is retained in a tilted position.

In witness whereof, I have hereunto subscribed my name in the presence of two witnesses.

CHARLES J. SCHMIDT.

Witnesses:
　W. PERRY HAHN,
　M. R. ROCHFORD.